United States Patent [19]

Asaoka

[11] Patent Number: 5,064,629

[45] Date of Patent: Nov. 12, 1991

[54] TITANIUM-BORON-OXIDE, SYNTHETIC MATERIALS BASED THEREON AND METHOD OF PREPARING THE SAME

[75] Inventor: Hisatoshi Asaoka, Niigata, Japan

[73] Assignee: Makiki Asaoka, Japan

[21] Appl. No.: 624,182

[22] Filed: Dec. 7, 1990

Related U.S. Application Data

[63] Continuation-in-part of Ser. No. 207,295, Jun. 15, 1988, abandoned.

[30] Foreign Application Priority Data

Apr. 6, 1988 [JP] Japan ................................. 63-84363

[51] Int. Cl.$^5$ ............................................. C01B 35/12
[52] U.S. Cl. .................................... 423/279; 423/277; 423/579; 423/648.1; 502/64; 502/77; 208/46
[58] Field of Search ............ 423/277, 279, 579, 648.1; 502/64, 77; 208/46

[56] References Cited

U.S. PATENT DOCUMENTS

| | | | |
|---|---|---|---|
| 600,171 | 3/1898 | Pratt | 231/6 |
| 1,205,509 | 11/1916 | Boehringer | 423/277 |
| 2,882,243 | 4/1959 | Milton | 423/329 |
| 3,130,007 | 4/1964 | Breck | 423/328 |
| 3,328,119 | 6/1967 | Robson | 423/277 |
| 3,702,886 | 11/1972 | Argauer | 423/328 |
| 3,709,979 | 1/1973 | Chu | 423/329 |
| 4,285,919 | 8/1981 | Klotz et al. | 423/277 |
| 4,370,263 | 1/1983 | Visca | 502/325 |
| 4,410,501 | 10/1983 | Taramasso et al. | 423/326 |
| 4,519,998 | 5/1985 | Leen | 423/277 |
| 4,666,692 | 5/1987 | Taramasso et al. | 423/326 |
| 4,721,607 | 1/1988 | Haddad et al. | 423/277 |

FOREIGN PATENT DOCUMENTS

0094024 11/1983 European Pat. Off. .
3240869 5/1984 Fed. Rep. of Germany .
3240870 5/1984 Fed. Rep. of Germany .

OTHER PUBLICATIONS

Bibby et al.—Nature, vol. 317 (1985) p. 157.
W. A. van Erp et al.—Zeolites, 7 (1987), 286-288.
H. Oisheng et al.—J. Chem. Soc., Chem. Comm. (1988) 1486-1487.
T. Sakata—J. Photochem, 20 (1985) 205-215.
J. Kiwi et al.—J. Phys. Chem., 88 (1984) 1302-1307.

Primary Examiner—R. Bruce Breneman
Attorney, Agent, or Firm—Eckert Seamans Cherin & Mellott

[57] ABSTRACT

The present invention is concerned with a synthetic crystalline titanium-boron-oxide, synthetic crystalline materials based thereon that contain an oxide of aluminum or silicon or their combination and the methods for their preparation. These materials are useful as catalysts for many reactions and in their metal-loaded form as photocatalysts for the cleavage of water.

8 Claims, No Drawings

TITANIUM-BORON-OXIDE, SYNTHETIC MATERIALS BASED THEREON AND METHOD OF PREPARING THE SAME

CROSS REFERENCE TO RELATED APPLICATIONS

This application is a continuation-in-part application of application U.S. Ser. No. 207,295 filed June 15, 1988, now abandoned. The pending application hereinabove is incorporated by reference herein and is made a part hereof.

BACKGROUND OF THE INVENTION (a) Field of the Invention

The present invention relates to sythetic crystalline titanium-boron-oxide, synthetic crystalline materials based thereon containing an oxide of aluminum or silicon or combinations thereof and to methods for their preparation. These materials are useful as catalysts for organic compound conversion and in their metal-loaded form as photocatalysts for the cleavage of water.

(b) Description of Prior Art

The synthesis of zeolites and zeolitic materials has been pursued for nearly 50 years, and the literature is filled with reports on structure, methods of preparation, and uses for these materials.

The synthesis of aluminosilicates, the microporous silica polymorphs, titanium aluminophosphates and borosilicate molecular sieves has received much attention in both open and patent literature.

Hydrothermal techniques are typical methods of synthesis used for more than 150 varieties of synthetic molecular sieve zeolites. The techniques consist of the preparation of a gel comprising a source of alkali and water. However, reports on the synthesis of zeolitic materials from organic solvent systems are few.

Bibby et al. reported the synthesis of silica-sodalite and aluminosilicate-sodalites from ethylene glycol and propanol, in Nature, Vol. 317 (1985) p. 157, and van Erp et al. synthesized BaT, hydroxysodalite and kaliophilite using organic solvents, such as glycol, glycerol, sulpholane, dimethyl sulfoxide, ethanol, etc., in Zeolites, Vol. 7 (1987) p. 286.

Recently, Oisheng et al. synthesized pentasil-type zeolites using ethylene glycol, glycerol and butyl alcohol in J. Chem. Soc., Chem. Commn., (1988) p. 1486. Also, various boron-containing inorganic oxides, identified as Bolite, have been synthesized by Asaoka in U.S. patent application Ser. No. 207,295, (1988). The non-aqueous route is especially suited for the preparation of these oxides using tetraalkyl orthotitanates and/or tetraalkyl orthosilicates and/or trialkyl aluminates and orthoboric acid.

A family of Bolites comprises seven types of oxide species, namely, Bolite-1 Ti-Al-Si-B-O, Bolite-2 Ti-Al-B-O, Bolite-3 Al-Si-B-O, Bolite-4 Ti-Si-B-O, Bolite-5 Ti-B-O, Bolite-6 Al-B-O and Bolite-7 Si-B-O.

Generally, zeolites and zeolitic materials include a wide variety of natural and synthetic crystalline materials. These are crystalline aluminosilicates, aluminoborosilicates and titanoborosilicates containing positive ions, such as alkali metal or alkaline earth metal ions. The Bolite materials include neither monovalent alkali metals nor divalent alkaline earth metals.

U.S. Pat. No. 4,519,998 which is here considered relevant discloses the crystalline titanoborosilicate identified as ZMQ-TB. The claimed ZMQ-TB crystalline titanoborosilicates are prepared by using titanium potassium oxalate, an alkali tetra-hydroborate and sodium silicate in the presence of an alkylammonium ion and/or a mineralization agent, such as sodium chloride under hydrothermal reaction conditions.

The product obtained has a specified X-ray diffraction pattern. The above X-ray diffraction pattern is applicable to all ZMQ-TB compositions. Such crystalline titanoborosilicates can generally be represented in terms of molar ratios of oxides by the formula:

$$0.9 \pm 0.2 M_{2/n}O:TiO_2:B_2O_3:ySiO_2:zH_2O$$

wherein M is at least one cation of valence n, y is a number between 8 and 500 and z is a number between 0 and 100. As taught herein, the $TiO_2$ to $B_2O_3$ ratio is equal to 1.

There is also provided a process for the conversion of alcohols such as methanol and ethanol into hydrocarbons using the ZMQ-TB titanoborosilicate.

Additional relevant prior art comprising U.S. Pat. No. 4,410,501, EP 0,094,024, Gr(German Pat.) 3,240,869 and Gr 3,240,870, relate to titanosilicates.

A further object of this invention is to provide a semiconductor loaded with metal for the cleavage of water.

In recent years considerable interest has been shown in the field of photocatalysts and solar energy conversion. In particular, a great deal of attention has focused on the use of semiconductors to cleave water photochemically, and of the many available semiconductors it is the n-type oxides such as titanium oxide, strontium titanate and cadmium sulfide which have been most widely used.

A photocatalyst may be constructed by depositing metals (Pt, Pd, Ru, Rh, Nb, Au, Cu, Ag) or some oxides ($RuO_2$) onto a particle of a semiconductor.

These surface-modified photocatalysts, such as $Pt/TiO_2$, have been used to photo-oxidise water, sulphite, cyanide, acetate, alcohols, hydrocarbons, carbohydrates, active carbon and biomass, and simultaneously reduce water.

The photocatalytic reactions can also be applied to organic synthesis of organic acids and amino acid synthesis.

SUMMARY OF THE INVENTION

The present invention relates to a novel family of stable synthetic titanium-boron-oxide and synthetic materials based thereon possessing a specific X-ray diffraction pattern. It is understood that the titanium and boron constitute an inherent part of the material composition.

This invention relates also to methods of producing these materials. Particularily, the methods involve gelation from reaction mixtures containing: tetraalkyl orthotitanates; tetraalkyl orthosilicates and trialkyl aluminates, either free or in combinations with these components; orthoboric acid; and pyridine.

Another object of this invention is to provide a semiconductor loaded with metal for the cleavage of water.

DETAILED DESCRIPTION OF THE INVENTION

In order that the synthetic materials according to the present invention may be obtained, the preparation procedure specified hereinafter can be adopted with advantage.

The synthetic materials according to the present invention are prepared by the reaction of the following reactants; Ti(OR)$_4$, Al(OR)$_3$, Si(OR)$_4$ and H$_3$BO$_3$: wherein R in the chemical formula denotes an alkyl group selected from the group consisting of methyl, ethyl, propyl, isopropyl, butyl and isobutyl.

The reactants are dissolved in pyridine in a concentration of from 5% to 30% by weight, preferably about 10% by weight. The reaction mixture is efficiently stirred in a closed environment at a temperature of from 30° C. to 110° C., preferably between 60° C. and 90° C. for a time ranging 5 minutes to 12 hours, preferably for about 7 hours.

The reaction mixture containing the gelatinous product is allowed to stand with occasional shaking at a temperature of from 40° C. to 100° C., preferably between 60° C. and 80° C., for a period ranging from a few days to several weeks, preferably for a week.

After the reaction, the reaction mixture is cooled to room temperature and the clear supernatant is removed by decantation. The residual solvent is evaporated at 90° C., under reduced pressure. The dried solid is broken into a particulate material and then a suspension is prepared containing 1 gram of the particulate material and water. The volume of water in the suspension is from 20 ml to 200 ml, preferably between 50 ml and 100 ml, The suspension is maintained with stirring at a temperature of from 30° C. to 98° C., preferably between 50° C. and 80° C..

The water is changed every 6 hours to 12 hours. On and after the third exchange of water, a small amount of the precipitate is heated to about 500° C.. If the material is colored, the same procedure of water treatment is repeated until coloration is eliminated. The obtained solid is separated from the water by filtration and washed with water. The product is dried at about 80° C. until constant weight and calcined (fired) in the air at a temperature of from 200° C. to 1200° C., preferably between 400° C. and 600° C. for time ranging 1 hour to 24 hours, preferably about 15 hours. By the above procedure, the almost complete removal of the organic ingredients from the products is achieved. After heating, the product is allowed to cool under reduced pressure to obtain the final product. The product may contain a small amount of water, the quantitity being greater or smaller, consistent with the calcination temperature.

A family of synthetic crystalline materials, identified as Bolite-1, Bolite-2, Bolite-4 and Bolite-5, has characteristic X-ray diffraction patterns as shown in Tables hereinafter. Such crystalline Bolites can be represented in terms of molar ratios of oxides and in the anhydrous state, by the general formula:

WAl$_2$O$_3$:XSiO$_2$:YTiO$_2$:ZB$_2$O$_3$ wherein W is a value within the range of 0 to about 600, X is a value within the range of 0 to about 600, Y is a value within the range of 2 to about 800 and Z is a value greater than 0 but not exceeding 1.

Particularly, the value of Y suitably falls within the range of 3 to about 700, and preferably about 5 to about 500. Moreover, the value of Z suitably is within the range of about 0.0001 to 1, and preferably about 0.0001 to 1.

The values of W and X are dependent upon the particular type of Bolite. For Bolite-4, W is equal to 0 and for Bolite-2, X is 0. For Bolite-5, both W and X are 0 and for Bolite-1, both W and X are not 0.

More particularly for Bolite-4, the value of X suitably is within the range of about 0.00001 to about 300, preferably about 0.001 to about 50, and more preferably about 0.001 to about 7.

The materals obtained with the present invention are characterized by a well-defined crystalline structure, such as can be seen in the X-ray diffraction spectra reported in the various Tables hereinafter. These data were obtained by standard X-ray diffraction technique using the k-alpha doublet of copper radiation. Interplanar spacings are represented by "d" and are expressed in terms of Angstrom units (Å). Relative intensities were calculated from the relation $I/I_0 \times 100$, where $I_0$ is the intensity of the strongest line and I is the intensity of each peak height measured. The relative intensities are arbitrarily assigned the following values:

| Relative Peak Height | Assigned Strength |
|---|---|
| less than 10 | VW (very weak) |
| 10–19 | W (weak) |
| 20–39 | M (medium) |
| 40–70 | S (strong) |
| greater than 70 | VS (very strong) |

These assigned strengths are used throughout this application.

The materials of this invention can also be modified for certain applications in water splitting under illumination by metal loading techniques well known in the art.

The following examples demonstrate, but are in no way intended to limit the present invention.

EXAMPLE I

A sample of Bolite-5 crystalline titanium-boron-oxide according to this invention was prepared by reacting 32.9 grams of titanium isopropylate with 7.2 grams of orthoboric acid in 400 grams of pyridine at 70° C.. The mixture was maintained with stirring for 7 hours in a sealed vessel. The reaction mixture containing the gelatinous product was allowed to stand at 75° C. for 10 days with occasional shaking. The reaction mixture was then cooled to room temperature and the clear supernatant was removed by decantation. Residual solvents were evaporated at 90° C. under reduced pressure.

The resulting solid, in a finely-divided form, was dispersed in 500 ml of water at a temperature of 60° C. and the suspension that resulted was stirred. The water was replaced by the same volume of water every 12 hours by decantation. On and after the third change of water, a small portion (ca. 0.05 gram) of the precipitate was heated at 500° C.. If the material is colored, the procedure is repeated until coloration is eliminated. The resulting solid material was then separated from water by filtration and washed with 1000 ml of water. The product was dried at 80° C. until constant weight and then calcined in the air at 480° C. for 15 hours.

After heating, the product was allowed to cool under reduced pressure. The yield of the final product was approximately 9.3 grams. Chemical analysis of the calcined product gave the following result expressed in terms of oxide-mole ratios:
TiO$_2$/B$_2$O$_3$ . . . 6230.

The calcined material was identified by X-ray diffraction analysis as a crystalline material having an X-ray diffraction pattern comprising the X-ray diffraction lines and assigned strengths as presented in Table I hereinbelow.

TABLE I

| Interplanar Spacings, d(Å) | Relative Intensity ($I/I_O$) | Assigned Strength |
| --- | --- | --- |
| 3.522 | 100 | VS |
| 2.902 | 5 | VW |
| 2.432 | 6 | VW |
| 2.379 | 19 | W |
| 2.333 | 7 | VW |
| 2.243 | 6 | VW |
| 1.892 | 27 | M |
| 1.699 | 9 | VW |
| 1.667 | 16 | W |
| 1.625 | 9 | VW |
| 1.568 | 4 | VW |
| 1.480 | 15 | W |
| 1.361 | 13 | W |
| 1.264 | 7 | VW |
| 1.247 | 2 | VW |
| 1.166 | 4 | VW |
| 1.042 | 4 | VW |

EXAMPLE II

This example illustrates the synthesis of Bolite-2 crystalline aluminum-titanium-boron-oxide. The procedure is the same as for Example 1, by using 10.2 grams of aluminum isopropylate, 42.6 grams of titanium isopropylate and 12.4 grams of orthoboric acid.

The yield was approximately 15.5 grams of solid. Chemical analysis of the calcined product gave the following result expressed in terms of oxide-mole ratios:
$TiO_2/B_2O_3$ ... 10.3
$Al_2O_3/(TiO_2+B_2O_3)$ ... 0.12.

The calcined product was identified by X-ray diffraction analysis as a crystalline material having an X-ray diffraction pattern comprising the X-ray diffraction lines and assigned strengths as presented in Table II hereinbelow.

TABLE II

| Interplanar Spacings, d(Å) | Relative Intensity ($I/I_O$) | Assigned Strength |
| --- | --- | --- |
| 3.507 | 100 | VS |
| 2.350 | 24 | M |
| 1.893 | 26 | M |
| 1.678 | 22 | M |
| 1.474 | 14 | W |
| 1.337 | 6 | VW |
| 1.258 | 9 | VW |
| 1.161 | 7 | VW |
| 1.051 | 5 | VW |
| 1.042 | 5 | VW |

EXAMPLE III

This example illustrates the synthesis of Bolite-4 crystalline silicon-titanium-boron-oxide. The procedure is the same as for Example 1, by using 10.4 grams of tetraethyl orthosilicate, 43.2 grams of titanium isopropylate and 6.2 grams of orthoboric acid.

The yield was approximately 12.2 grams of solid. Chemical analysis of the calcined product gave the following result expressed in terms of oxide-mole ratios:
$TiO_2/B_2O_3$ ... 3599
$SiO_2/(TiO_2+B_2O_3)$ ... 0.16.

The calcined product was identified by X-ray diffraction analysis as a crystalline material having an X-ray diffraction pattern comprising the X-ray diffraction lines and assigned strengths as presented in Table III hereinbelow.

TABLE III

| Interplanar Spacings, d(Å) | Relative Intensity ($I/I_O$) | Assigned Strength |
| --- | --- | --- |
| 3.521 | 100 | VS |
| 2.369 | 22 | M |
| 1.895 | 25 | M |
| 1.686 | 20 | M |
| 1.475 | 12 | W |
| 1.360 | 6 | VW |
| 1.345 | 6 | VW |
| 1.335 | 6 | VW |
| 1.295 | 9 | VW |
| 1.167 | 5 | VW |
| 1.044 | 4 | VW |

EXAMPLE IV

This example illustrates the synthesis of Bolite-1 crystalline aluminum-silicon-titanium-boron-oxide. The procedure is the same as for Example 1, by using 3.2 grams of aluminum isopropylate, 3.3 grams of tetraethyl orthosilicate, 27.4 grams of titanium isopropylate and 5.9 grams of orthoboric acid.

The yield was approximately 7.1 grams of solid. Chemical analysis of the calcined product gave the following result expressed in terms of oxide-mole ratios:
$TiO_2/B_2O_3$ ... 34.1
$SiO_2/(TiO_2+B_2O_3)$ ... 0.109
$Al_2O_3/(TiO_2+B_2O_3)$ ... 0.064
$(Al_2O_3+SiO_2)/(TiO_2+B_2O_3)$ ... 0.17.

The calcined product was identified by X-ray diffraction analysis as a crystalline material having an X-ray diffraction pattern comprising the X-ray diffraction lines and assigned strengths as presented in Table IV hereinbelow.

TABLE IV

| Interplanar Spacings, d(Å) | Relative Intensity ($I/I_O$) | Assigned Strength |
| --- | --- | --- |
| 3.520 | 100 | VS |
| 2.408 | 7 | VW |
| 2.377 | 20 | M |
| 2.333 | 7 | VW |
| 1.894 | 26 | M |
| 1.698 | 15 | W |
| 1.665 | 15 | W |
| 1.482 | 11 | W |
| 1.361 | 4 | VW |
| 1.337 | 5 | VW |
| 1.261 | 7 | VW |
| 1.164 | 5 | VW |
| 1.043 | 2 | VW |

EXAMPLE V

In this example, the materials of Examples 1, 2, 3 and 4 were used to obtain a photocatalyst.

The chemical vapour deposition (CVD) method has been used for obtaining a Pt-loaded photocatalyst, said catalyst having a particle size no greater than 10 microns in diameter and being reduced in the presence of $H_2$ at 400° C. for 4 hours prior to use. The resulting metal loadings were verified by inductive coupled plasma spectrometry. For the platinized support used in the present experiments the Pt-loading was about 0.02% by weight. Electron microscope examination confirmed that this platinum was not deposited as a uniform layer, but as islands.

Photolysis experiments were carried out using 0.02 gram of catalyst dispersed in 5 ml of 0.1-N NaOH solution. The suspension was placed in a quartz tube equipped with an optically flat entrance window having an irradiated surface of 1.54 cm$^2$. Illumination was carried out using a 300 W Xe lamp equipped with a water filter. Hydrogen evolution occurred at a constant rate. Analysis of irradiated solution by titration with KMnO$_4$ showed that peroxides were produced.

The evolved amounts of hydrogen were volumetrically measured and are shown in Table V hereinbelow.

TABLE V

|  | H$_2$ evolution (25° C./atm) |  |
|---|---|---|
| Bolite-1 | 6.5 | μl/h |
| Bolite-2 | 3.2 | μl/h |
| Bolite-4 | 8.7 | μl/h |
| Bolite-5 | 4.8 | μl/h |

What is claimed is:

1. A synthetic crystalline material having a composition expressed in terms of moles of oxides in the anhydrous state, by the formula:

YTiO$_2$:ZB$_2$O$_3$ wherein Y is a value between 2 and about 800 and Z is a value greater than 0 but not exceeding 1, and having an X-ray diffraction pattern comprising the x-ray diffraction lines and assigned strengths set forth in Table I below:

TABLE I

| Interplanar Spacings, d(A) | Relative Intensity (I/Io) | Assigned Strength |
|---|---|---|
| 3.522 | 100 | VS |
| 2.902 | 5 | VW |
| 2.432 | 6 | VW |
| 2.379 | 19 | W |
| 2.333 | 7 | VW |
| 2.243 | 6 | VW |
| 1.892 | 27 | M |
| 1.699 | 9 | VW |
| 1.667 | 16 | W |
| 1.625 | 9 | VW |
| 1.568 | 4 | VW |
| 1.480 | 15 | W |
| 1.361 | 13 | W |
| 1.264 | 7 | VW |
| 1.247 | 2 | VW |
| 1.166 | 4 | VW |
| 1.042 | 4 | VW." |

2. A synthetic crystalline material in which aluminum has been introduced by addition of an oxide of aluminum, said material having a composition expressed in terms of moles of oxides in the anhydrous state, by the formula:

WAl$_2$O$_3$:YTiO$_2$:ZB$_2$O$_3$ wherein W is a value greater than 0 but not exceeding about 600, Y is a value between 2 and about 800, Z is a value greater than 0 but not exceeding 1, and having an X-ray diffraction pattern comprising the X-ray diffraction lines and assigned strengths set forth in Table II below:

TABLE II

| Interplanar Spacings, d(A) | Relative Intensity (I/Io) | Assigned Strength |
|---|---|---|
| 3.507 | 100 | VS |
| 2.350 | 24 | M |
| 1.893 | 26 | M |
| 1.678 | 22 | M |
| 1.474 | 14 | W |
| 1.337 | 6 | VW |
| 1.258 | 9 | VW |
| 1.161 | 7 | VW |
| 1.051 | 5 | VW |
| 1.042 | 5 | VW." |

3. A synthetic crystalline material in which silicon has been introduced by the addition of an oxide of silicon, said material having a composition expressed in terms of moles of oxides in the anhydrous state, by the formula:

XSiO$_2$:YTiO$_2$:ZB$_2$O$_3$ wherein X is a value greater than 0 but not exceeding about 600, Y is a value between 2 and about 800, Z is a value greater than 0 but not exceeding 1, and having an X-ray diffraction pattern comprising the X-ray diffraction lines and assigned strengths set forth in Table III below:

TABLE III

| Interplanar Spacings, d(A) | Relative Intensity (I/Io) | Assigned Strength |
|---|---|---|
| 3.521 | 100 | VS |
| 2.369 | 22 | M |
| 1.895 | 25 | M |
| 1.686 | 20 | M |
| 1.475 | 12 | W |
| 1.360 | 6 | VW |
| 1.345 | 6 | VW |
| 1.335 | 6 | VW |
| 1.295 | 9 | VW |
| 1.167 | 5 | VW |
| 1.044 | 4 | VW." |

4. A synthetic crystalline material in which aluminum and silicon have been introduced by addition of the oxides of aluminum and silicon, said material having a composition expressed in terms of moles of oxides in the anhydrous state, by the formula:

WAl$_2$O$_3$:XSiO$_2$:YTiO$_2$:ZB$_2$O$_3$ wherein W is a value greater than 0 but not exceeding about 600, X is a value greater than 0 but not exceeding about 600, Y is a value between 2 and about 800, Z is a value greater than 0 but not exceeding 1, and having an X-ray diffraction pattern comprising the X-ray diffraction lines and assigned strengths set forth in Table IV below:

TABLE IV

| Interplanar Spacings, d(A) | Relative Intensity (I/Io) | Assigned Strength |
|---|---|---|
| 3.520 | 100 | VS |
| 2.408 | 7 | VW |
| 2.377 | 20 | M |
| 2.333 | 7 | VW |
| 1.894 | 26 | M |
| 1.698 | 15 | W |
| 1.665 | 15 | W |
| 1.482 | 11 | W |
| 1.361 | 4 | VW |
| 1.337 | 5 | VW |

TABLE IV-continued

| Interplanar Spacings, d(A) | Relative Intensity (I/Io) | Assigned Strength |
|---|---|---|
| 1.261 | 7 | VW |
| 1.164 | 5 | VW |
| 1.043 | 2 | VW." |

5. A method for preparing the synthetic crystalline material of claim 1, which method comprises:
 (a) providing a reaction mixture comprising:
  (1) an alkoxide of $Ti(OR)_4$, wherein R is at least one alkyl group selected from the group consisting of methyl, ethyl, propyl, isopropyl, butyl and isobutyl,
  (2) orthoboric acid,
  (3) pyridine as a solvent thereof; and
 (b) maintaining said reaction mixture in (a) at suitable reaction conditions to effect formation of a gelatinous product, said reaction conditions comprising a reaction temperature within the range of 30° C. to 110° C., and for a time of from 5 minutes to 12 hours; and
 (c) removing pyridine by evaporation from said gelatinous product in (b) and impregnating the resultant material with water at a temperature between 30° C. and 98° C.; and
 (d) collecting the resulting solid material in (c) on a filter and thereafter washing, drying and calcining it in air at a temperature between 200° C. and 1200° C. for a time of from 1 hour to 24 hours.

6. A method for preparing the synthetic crystalline material of claim 2 which method comprises:
 (a) providing a reaction mixture comprising:
  (1) alkoxides of $Ti(OR)_4$ and $Al(OR)_3$ wherein R is at least one alkyl group selected from the group consisting of methyl, ethyl, propyl, isopropyl, butyl and isobutyl,
  (2) orthoboric acid,
  (3) pyridine as a solvent thereof; and
 (b) maintaining said reaction mixture in (a) at suitable reaction conditions to effect formation of a gelatinous product, said reaction conditions comprising a reaction temperature within the range of 30° C. to 110° C., and for a time of from 5 minutes to 12 hours; and
 (c) removing pyridine by evaporation from said gelatinous product in (b) and impregnating the resultant material with water at a temperature between 30° C. and 98° C.; and
 (d) collecting the resulting solid material in (c) on a filter and thereafter washing, drying and calcining it in air at a temperature between 200° C. and 1200° C. for a time of from 1 hour to 24 hours.

7. A method for preparing the synthetic crystalline material of claim 3 which method comprises:
 (a) providing a reaction mixture comprising:
  (1) alkoxides of $Si(OR)_4$ and $Ti(OR)_4$ wherein R is at least one alkyl group selected from the group consisting of methyl, ethyl, propyl, isopropyl, butyl and isobutyl,
  (2) orthoboric acid,
  (3) pyridine as a solvent thereof; and
 (b) maintaining said reaction mixture in (a) at suitable reaction conditions to effect formation of a gelatinous product, said reaction conditions comprising a reaction temperature within the range of 30° C. to 110° C., and for a time of from 5 minutes to 12 hours; and
 (c) removing pyridine by evaporation from said gelatinous product in (b) and impregnating the resultant material with water at a temperature between 30° C. and 98° C.; and
 (d) collecting the resulting solid material in (c) on a filter and thereafter washing, drying and calcining it in air at a temperature between 200° C. and 1200° C. for a time of from 1 hour to 24 hours.

8. A method for preparing the synthetic crystalline material of claim 4 which method comprises:
 (a) providing a reaction mixture comprising:
  (1) alkoxides of $Al(OR)_3$, $Si(OR)_4$ and $Ti(OR)_4$ wherein R is at least one alkyl group selected from the group consisting of methyl, ethyl, propyl, isopropyl, butyl and isobutyl,
  (2) orthoboric acid,
  (3) pyridine as a solvent thereof; and
 (b) maintaining said reaction mixture in (a) at suitable reaction conditions to effect formation of a gelatinous product, said reaction conditions comprising a reaction temperature within the range of 30° C. to 110° C., and for a time of from 5 minutes to 12 hours; and
 (c) removing pyridine by evaporation from said gelatinous product in (b) and impregnating the resultant material with water at a temperature between 30° C. and 98° C.; and
 (d) collecting the resulting solid material in (c) on a filter and thereafter washing, drying and calcining it in air at a temperature between 200° C. and 1200° C. for a time of from 1 hour to 24 hours.

* * * * *